No. 760,486. PATENTED MAY 24, 1904.
F. RIEWE.
MACHINE FOR DESTROYING COTTON BOLL WEEVILS.
APPLICATION FILED FEB. 20, 1904.
NO MODEL.
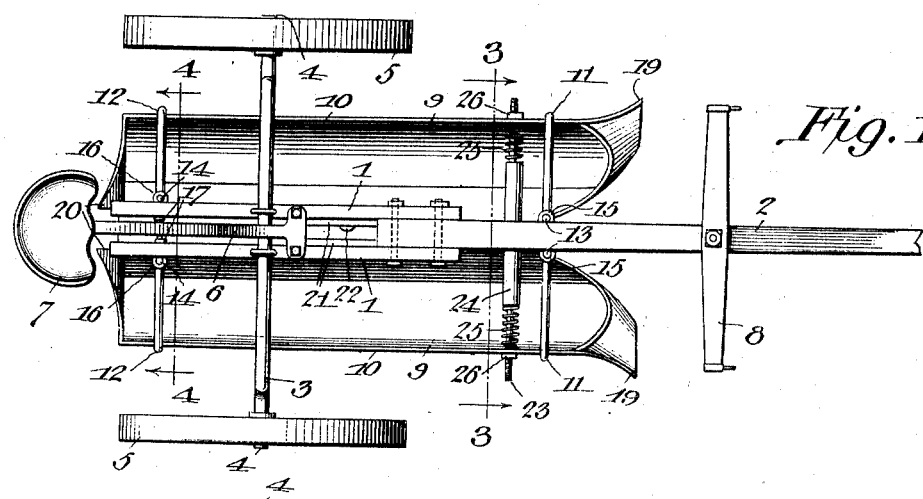
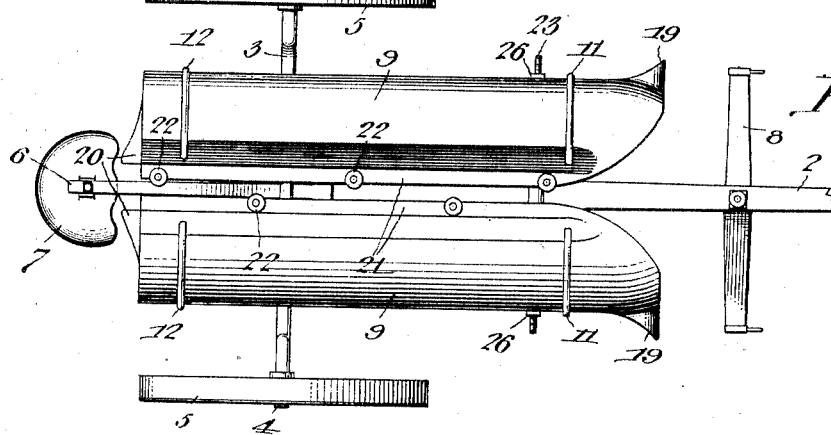
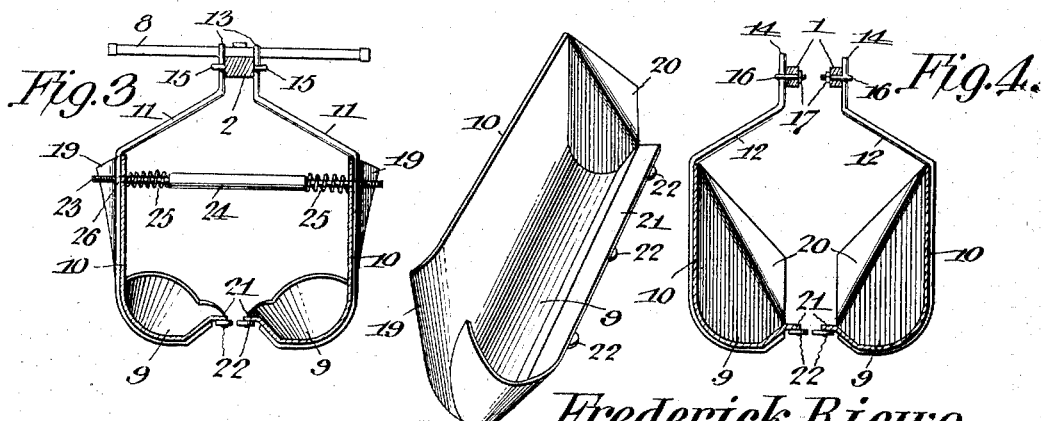
Witnesses
Frederick Riewe,
Inventor.
by C. A. Snow & Co.
Attorneys No. 760,486. Patented May 24, 1904.

UNITED STATES PATENT OFFICE.

FREDERICK RIEWE, OF POTTSVILLE, TEXAS.

MACHINE FOR DESTROYING COTTON-BOLL WEEVILS.

SPECIFICATION forming part of Letters Patent No. 760,486, dated May 24, 1904.

Application filed February 20, 1904. Serial No. 194,578. (No model.)

*To all whom it may concern:*

Be it known that I, FREDERICK RIEWE, a citizen of the United States, residing at Pottsville, in the county of Hamilton and State of Texas, have invented a new and useful Machine for Destroying Cotton-Boll Weevils, of which the following is a specification.

This invention relates to that class of devices which are provided especially for the purpose of gathering and destroying the noxious insects known as "cotton-boll weevils;" and it has for its object to provide a device of this class which shall be simple in construction, durable and effective in operation, and easily manipulated to effect the desired result.

With these and other ends in view, which will appear as the nature of the invention is better understood, the said invention consists in the improved construction, arrangement, and combination of parts, which will be hereinafter fully described, and particularly pointed out in the claims.

In the accompanying drawings I have illustrated a simple and preferred form of my invention, it being understood, however, that I do not limit myself to the precise structural details herein exhibited, but reserve the right to any changes, alterations, and modifications which may come fairly within the scope of the invention and which may be resorted to without departing from the spirit or sacrificing the utility of the same.

In said drawings, Figure 1 is a plan view of a device constructed in accordance with the principles of my invention. Fig. 2 is a bottom plan view of the same. Fig. 3 is a transverse sectional view taken on the line 3 3 in Fig. 1. Fig. 4 is a transverse sectional view taken on the line 4 4 in Fig. 1. Fig. 5 is a perspective view of one of the troughs detached.

Corresponding parts in the several figures are indicated by similar numerals of reference.

The frame of my improved device comprises a pair of side pieces 1 1, between which the forwardly-extending tongue 2 is secured. The side pieces 1 1 are suitably connected with an arched axle 3, having spindles 4, upon which the transporting-wheels 5 are journaled. A seat-bar 6, supported upon the side pieces 1 1, carries the driver's seat 7.

8 designates a doubletree connected in the usual manner with the tongue 2 for the application of draft.

9 9 designate a pair of troughs, which are provided at their outer edges with upwardly-extending flanges 10. The front ends of the troughs 9 9 are beveled upon their inner sides, so that the plants which are to be operated upon may be readily admitted between said troughs. The latter are provided near their front and their rear ends with hangers 11 end 12, terminating in upwardly-extending arms 13 and 14, the former of which engage staples 15 upon the sides of the tongue, while the arms 14 engage eyebolts 16, extending through side pieces 1 1 near the rear ends of the latter, and are provided with nuts 17, which may be tightened to secure the arms of the hangers at any desired vertical adjustment of the latter. The arms of the front hangers are secured in such a manner that the troughs supported thereby shall be slightly elevated from the ground. The rear ends of the troughs may likewise be elevated from the ground, or they may be caused to drag upon the ground, if preferred.

The troughs 9 are provided, as already described, with upwardly-extending flanges 10 at their outer edges. The front ends of these flanges are bent outwardly, as shown at 19, and the rear end pieces 20 of the troughs are bent rearwardly at their inner edges, so as to permit of the passage of the plants without injury to the latter. The troughs are provided at their inner edges with approximately horizontal flanges 21. To the under sides are journaled wheels or rollers 22, the latter being disposed intercurrently with relation to each other upon the two troughs. It follows that when in the operation of the device the stems of the plants enter between the approximately horizontal flanges at the inner edges of the troughs they will be subjected to contact with the said rollers first on one side and then on the other, being thus shaken, with the effect that the insects and the infested bolls will become loosened and drop into the troughs or receptacles in which a quantity of crude oil has been previously placed, this oil having been by practical experience found to be destructive to the life of these insects and their larvæ.

The flanges 10 of the troughs are connected near their front ends by a screw-threaded spacing-rod 23, having an intermediately-disposed sleeve 24, between the ends of which and the flanges 10 are interposed springs 25, which serve to force said flanges outwardly against the tightening-nuts 26. By loosening the latter it will be seen that the springs will be effective in spacing the front ends of the troughs apart, while by tightening the nuts against the tension of the springs the front ends of the troughs may be brought more closely together, this adjustment being necessary and desirable according to the growth and development of the plants that are to be operated upon.

From the foregoing description, taken in connection with the drawings hereto annexed, the operation and advantages of this invention will be readily understood. It will be seen first of all that the device is capable of adjustment, whereby it is adapted to operate upon plants at different stages in their growth. The stems of the plants as the latter pass between the troughs of the device will be subjected to a positive and thorough shaking, whereby the insects and infested bolls will become loosened and drop into the troughs containing material which is destructive to the insects. The flanges at the outer edges of the troughs constitute shields which prevent the insects from escaping laterally, as is oftentimes the case when no provision is made to prevent this, and consequently the operation of the device will be found to be thoroughly effective. The device, moreover, is specially constructed in such a manner as to avoid injury to the plants with which it comes in contact.

The hangers by means of which the troughs are connected with the frame of the machine are made, preferably, of wire sufficiently resilient to enable the troughs to partake of a vibratory movement which is imparted and assisted by the stalks of the plants, which latter pass between the stalk-engaging rollers upon the inner edges of the gathering-troughs. Thus it will be observed that a vibratory motion is set up, which is communicated from the troughs to the plants, which is non-injurious and highly effective in causing the insects and the infested bolls to drop from the latter.

Having thus described my invention, I claim—

1. In a device of the class described, the combination with suitable supporting means, of a pair of troughs suitably spaced apart and adjustable spacing means including a screw-threaded rod, a sleeve upon the latter, springs disposed between the ends of said sleeve and the adjacent parts of the troughs, and nuts upon the ends of the screw-threaded rod.

2. In a device of the class described, the combination with supporting means, a pair of spaced gathering-troughs, and rollers upon the inner adjacent edges of said troughs.

3. In a device of the class described, the combination with suitable supporting means, of a pair of troughs spaced apart and provided at their inner edges with approximately horizontal flanges, and rollers journaled upon the under sides of said flanges.

4. In a device of the class described, the combination with suitable supporting means of a pair of troughs spaced apart and provided at their inner edges with approximately horizontal flanges, and rollers journaled upon said flanges, extending beyond the margins of the latter and disposed in intercurrent relation upon the flanges of the two troughs.

5. In a device of the class described, a wheeled supporting-frame, a pair of troughs provided at their outer edges with upwardly-extending flanges, hangers connected with said troughs and having upwardly-extending arms, engaging means upon the frame of the machine for said arms, and stalk-engaging means disposed intercurrently upon the inner edges of the troughs.

6. In a device of the class described, a supporting-frame, a pair of gathering-troughs, flexible supporting means for said troughs, connected with the frame, and stalk-engaging means upon the inner adjacent edges of said members.

In testimony that I claim the foregoing as my own I have hereto affixed my signature in the presence of two witnesses.

FREDERICK RIEWE.

Witnesses:
 NANCY OPHELIA POTTS,
 JOHN STEPHEN POTTS.